March 13, 1956 L. A. TWIGG, JR 2,738,207
WAVEGUIDE COUPLING CLAMP WITH SPRING ALIGNING MEANS
Filed March 26, 1953
FIG. 1.
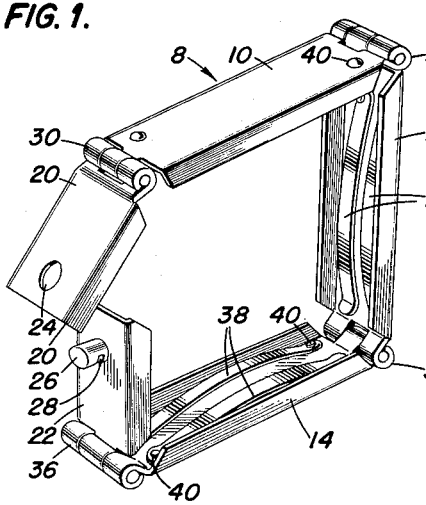
FIG. 4.
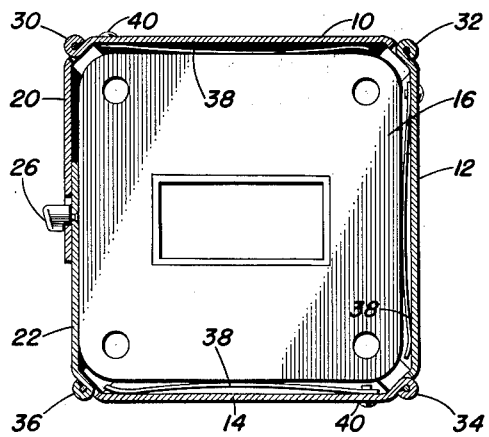
FIG. 2. FIG. 5.
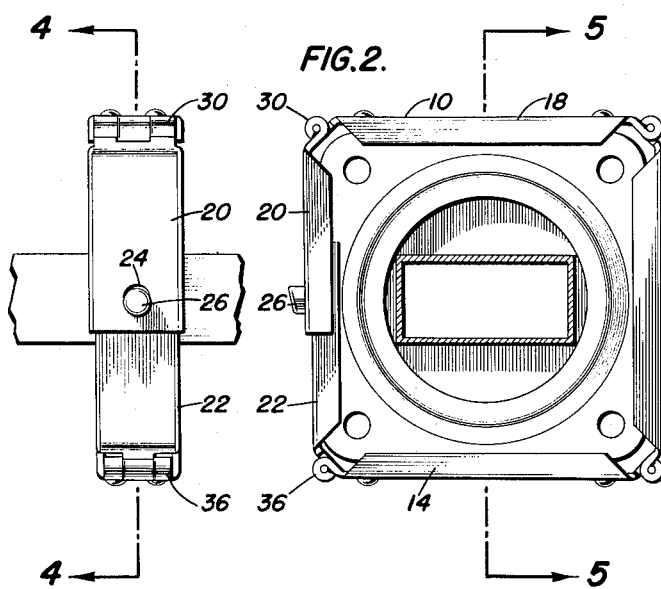
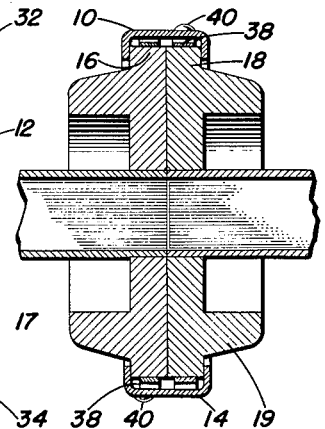
FIG. 3.
INVENTOR.
LESTER A. TWIGG, JR.
BY
ATTORNEYS United States Patent Office 2,738,207
Patented Mar. 13, 1956

2,738,207

WAVEGUIDE COUPLING CLAMP WITH SPRING ALIGNING MEANS

Lester A. Twigg, Jr., Rockville, Md., assignor to United States of America as represented by the Secretary of the Navy Application March 26, 1953, Serial No. 344,740

3 Claims. (Cl. 285—129)

The present invention relates to coupling clamps. More specifically, it relates to clamps by means of which adjacent sections of a waveguide may be releasably coupled.

In test work involving waveguides, it is often desired to disconnect and replace a section of a waveguide. Existing waveguide sections are provided with flanges which abut when two sections are joined. The previous conventional means employed for coupling adjacent sections are unsatisfactory because they do not provide the desired quick and easy coupling. For example, screws are unsatisfactory because of the time involved, and because they are often inaccessible. The clamps previously used are unsatisfactory because they require attachment by screws or other means to one of the sections being joined. Also, existing clamps do not provide the desired shielding at the junction of the adjacent sections.

Accordingly, it is an object of the invention to provide a coupling clamp by means of which coupling between adjacent flanged sections can be quickly and easily effected.

It is another object of the invention to provide a coupling clamp for adjacent flanged sections which does not require attachment to either section.

A further object of the invention is the provision of a coupling clamp for flanged sections having means for assisting the mating of the adjacent flanges.

It is a still further object of the invention to provide a clamp which affords the desired shielding at the junction of the sections of a waveguide.

Other objects and many of the attendant advantages of this invention will be appreciated readily as the same becomes understood by reference to the following detailed description when considered in connection with the accompanying drawing, wherein:

Fig. 1 is a perspective view of the clamp showing the latch in its open position;

Fig. 2 is a side elevation showing the clamp applied to the abutting flanges of adjacent waveguide sections;

Fig. 3 is an end elevation of the coupling clamp with the latch closed;

Fig. 4 is a sectional view along line 4—4 of Fig. 3; and

Fig. 5 is a sectional view along line 5—5 of Fig. 2.

Briefly, the invention comprises a folding coupling clamp having channel shaped sides that are adapted to fit over the abutting waveguide flanges. One side of the clamp includes a latch for fastening the clamp. Leaf springs are provided in the channels formed in the other sides to urge the openings of the adjacent waveguide sections into alignment.

Referring to the drawing the coupling clamp is indicated by the reference numeral 8. The clamp 8 comprises three side sections 10, 12 and 14 which are channel shaped to fit over the abutting flanges 16 and 18 of adjacent waveguide sections 17 and 19, respectively. A fourth side of the clamp is made up of two channel shaped sections 20 and 22. The adjacent ends of the respective sides are connected to each other by hinge joints in the manner shown at 30, 32, 34 and 36. The sides of the clamp are made of Mu-metal which has good electrical shielding characteristics.

While any suitable type of latch may be used with this coupling clamp, one that is particularly convenient is shown. The adjacent ends of sections 20 and 22 are arranged to overlap in the manner shown in Fig. 2 for latching the clamp in position about the waveguide flanges. The latch comprises an aperture 24 provided in the section 20 to receive the pin 26 carried on the section 22. The pin 26 has a slot 28 which serves to retain the section 20 in its latched position.

Each of the side sections 10, 12 and 14 has two flat spring members 38 pinned in the channel formed therein by rivets 40, as shown in Fig. 1. The springs 38 are slightly inwardly bowed, and are pinned at one end only. Two separate springs 38 are provided in each channel because all waveguide flanges are not accurately machined to the same dimensions. Also, it will be noted that the springs 38 provided in each side are pinned at opposite ends.

As best seen in Figs. 2 and 5 of the drawing, the coupling clamp is normally fitted about the abutting flanges of two adjacent waveguide sections 17 and 19. The clamp will provide good shielding because of the Mu-metal sides. In adidtion, the double spring arrangement in each side section will assist in aligning the adjacent waveguide sections, and will retain the clamp in its latched position.

Obviously many modifications and variations of the present invention are posible in the light of the above teachings. It is therefore to be understood that within the scope of the appended claims the invention may be practiced otherwise than as specificially described.

What is claimed is:

1. A clamp for releasably coupling waveguide sections having abutting flanges, comprising a plurality of channel shaped sides having adjacent ends hinged to each other, said sides being adapted to fit over said flanges, one of said sides consisting of two sections having overlapping adjacent ends, a pair of laterally spaced leaf springs mounted in the channel of each remaining side and extending longitudinally thereof for yieldingly contacting said flanges, and means for latching said sides in position about said flanges, said means including a pin carried on one of said overlapping ends, and an aperture provided in the other overlapping end to receive said pin.

2. In combination with a pair of waveguide sections having abutting flanges, a clamp for releasably coupling said waveguide sections, comprising a plurality of channel shaped sides having their adjacent ends hingedly connected, said sides being adapted to fit over said flanges, one of said sides consisting of two sections having overlapping adjacent ends, a pair of laterally spaced leaf springs mounted in the channel of each remaining side and extending longitudinally thereof for yieldingly contacting said flanges, and means for latching said sides in position about said flanges, said means including a pin carried on one of said overlapping ends and an aperture provided in the other overlapping end to receive said pin.

3. A clamp for releasably coupling waveguide sections, said sections terminating in similar flanges in abutment, each flange having more than two straight edges, said clamp having a corresponding number of straight channel shaped sides with adjacent ends hinged to each other, each of said sides being adapted to fit over an abutting pair of edges of said flanges, means carried by one of said sides for latching said sides in position about the edges of the flanges of the waveguide sections, and a pair of laterally spaced leaf springs mounted in the channel of each remaining side and extending longitudinally thereof for yieldingly contacting the edges of said flanges.

References Cited in the file of this patent

UNITED STATES PATENTS

| | | |
|---|---|---|
| 133,707 | Hutchinson | Dec. 10, 1872 |
| 620,623 | Weissenthanner | Mar. 7, 1889 |
| 662,736 | Prahar | Nov. 27, 1900 |
| 995,893 | Neitzel | June 20, 1911 |
| 1,290,590 | Lehew | Jan. 7, 1919 |
| 2,241,263 | Koppe | May 6, 1941 |
| 2,395,745 | King | Feb. 26, 1945 |
| 2,643,139 | Hamilton | June 23, 1953 |

FOREIGN PATENTS

| | | |
|---|---|---|
| 313,768 | Great Britain | June 20, 1929 |